United States Patent
Anisimovich

(10) Patent No.: US 9,703,776 B2
(45) Date of Patent: *Jul. 11, 2017

(54) AUTOMATIC TRAINING OF A SYNTACTIC AND SEMANTIC PARSER USING A GENETIC ALGORITHM

(71) Applicant: ABBYY InfoPoisk LLC, Moscow (RU)

(72) Inventor: Konstantin Anisimovich, Moscow (RU)

(73) Assignee: ABBYY PRODUCTION LLC, Moscow (RU)

(*) Notice: Subject to any disclaimer, the term of this patent is extended or adjusted under 35 U.S.C. 154(b) by 0 days.

This patent is subject to a terminal disclaimer.

(21) Appl. No.: 15/295,362

(22) Filed: Oct. 17, 2016

(65) Prior Publication Data

US 2017/0031900 A1 Feb. 2, 2017

Related U.S. Application Data

(63) Continuation of application No. 14/588,695, filed on Jan. 2, 2015.

(51) Int. Cl.
  *G06F 17/28* (2006.01)
  *G06F 17/27* (2006.01)

(52) U.S. Cl.
  CPC ........ *G06F 17/2854* (2013.01); *G06F 17/271* (2013.01); *G06F 17/2705* (2013.01); *G06F 17/2785* (2013.01); *G06F 17/2818* (2013.01); *G06F 17/2836* (2013.01)

(58) Field of Classification Search
  CPC .............. G06F 17/2705; G06F 17/271; G06F 17/2785; G06F 17/2818; G06F 17/2836; G06F 17/2854
  USPC .......................... 704/2, 9, 257, 4, 8, E15.022
  See application file for complete search history.

(56) References Cited

U.S. PATENT DOCUMENTS

| | | | | |
|---|---|---|---|---|
| 5,963,894 A | * | 10/1999 | Richardson | G10L 15/193 704/2 |
| 7,725,565 B2 | * | 5/2010 | Li | G06F 19/3493 709/219 |
| 8,407,208 B2 | * | 3/2013 | Ben Shahar | G06F 17/30663 707/715 |
| 2004/0078730 A1 | * | 4/2004 | Ma | G06F 11/0751 714/54 |

* cited by examiner

*Primary Examiner* — Charlotte M Baker
(74) *Attorney, Agent, or Firm* — Lowenstein Sandler LLP

(57) ABSTRACT

Disclosed are methods, systems, and computer-readable mediums for automatic training of a syntactic and semantic parser using a genetic algorithm. An initial population is created, where the initial population comprises a vector of parameters for elements of syntactic and semantic descriptions of a source sentence. A natural language compiler (NLC) system is used to translate the sentence from the source language into a target language based on the syntactic and semantic descriptions of the source sentence. A vector of quality ratings is generated where each quality rating in the vector of quality ratings is of a corresponding parameter in the vector of parameters. Quality ratings are evaluated according to specific criterion, which comprise parameters such as a BLEU score and a number of emergency sentences. A number of parameters in the vector of parameters are replaced with adjusted parameters.

20 Claims, 2 Drawing Sheets

AUTOMATIC TRAINING OF A SYNTACTIC AND SEMANTIC PARSER USING A GENETIC ALGORITHM

CROSS REFERENCE TO RELATED APPLICATIONS

This application is a Continuation of the U.S. patent application Ser. No. 14/588,695, filed Jan. 2, 2015 which claims the benefit of priority to Russian Patent Application No. 2014102113, filed Jan. 23, 2014; the disclosures of the priority applications are incorporated herein by reference in their entirety for all purposes.

BACKGROUND

One of the primary goals of machine translation is providing a high-quality result. Different technologies use various methods and approaches. For example, deep analysis of a source sentence based on an exhaustive linguistic descriptions of the language of the source sentence, and an independent semantic structure that reveals the meaning of the source sentence, each can be used to translate the source sentence into another target language. These also can be used to synthesize a translation that conveys the meaning of the source sentence to a target language using universal semantic descriptions and linguistic descriptions of the target language. The analysis and/or synthesis may make use of various types of statistics and ratings that are produced during analysis of parallel corpora to improve the accuracy of the translation. For example, the Natural Language Compiler (NLC) system uses linguistic descriptions (including, but not limited to, morphological, syntactic, semantic, and pragmatic descriptions) in constructing an independent syntactic structure for a sentence and in synthesizing the corresponding sentence in the language to which it is translated. The Natural Language Compiler (NLC) system is based on technology for universal language modeling and production of language structures (a model-based machine translation system), and is described in U.S. patent application Ser. No. 11/548,214, which was filed Oct. 10, 2006, and also in U.S. patent application Ser. Nos. 11/690,099, 11/690,102, and 11/690,104, each filed Mar. 22, 2007. In general, the more precise the lexical description of the language is, the higher the probability of obtaining an accurate translation.

The ambiguity of natural language, homonymy, and presence of multiple lexical variants and differing syntactic models can occasionally give rise to a large number of possible variants of parsing and translations of a source sentence during a machine translation process. A person can intuitively handle this type of issue using knowledge of the world and context of the source sentence, however, this issue can be problematic for a machine translation system. To achieve better results for a machine translation (e.g., as close as possible to a human translation), a number of ratings of links found during a system training stage are used by the NLC system for analyzing natural language. Many different types of ratings can be used, such as ratings of lexical meanings (frequency and probability of use) of words, ratings of additional surface slots and deep slots, ratings of a semantic description, and so forth. As such, the quality of the translation depends on the accuracy of the selected ratings, as the NLC system makes a selection of the best syntactic structure for the source sentence based on the ratings. The general syntactic structure of the sentence is a structure that describes the construction of the sentence, and indicates the main words, modifiers, and links therebetween.

This selection is currently done manually using parallel analysis of tagged text corpora. A manually-tagged corpus is a corpus in which a set of grammatical values is assigned to each word, and where each sentence has a single syntactical structure. A grammatical value is an element of a grammatical category, which is a closed system that provides a partition of a comprehensive set of word forms into non-intersecting classes, between which substantive differences are shown as the grammatical value. Examples of grammatical categories include gender, number, case, animacy, transitivity, and so forth.

SUMMARY

Disclosed herein are methods, systems, and computer-readable mediums for automatic training of a syntactic and semantic parser using a genetic algorithm. One embodiment relates to a method, which comprises creating, by a processing device, an initial population comprising a vector of parameters for elements of syntactic and semantic descriptions of a source sentence. The method further comprises using a natural language compiler (NLC) system to translate the source sentence into a resulting translation based on the syntactic and semantic descriptions of the source sentence. The method further comprises generating a vector of quality ratings, wherein each quality rating in the vector of quality ratings is of a corresponding parameter in the vector of parameters. The method further comprises replacing a number of parameters in the vector of parameters with adjusted parameters, wherein replacing the number of parameters comprises: randomly selecting a first parameter from the vector of parameters and adjusting the first parameter to create a first adjusted parameter; computing a quality rating of a translation, corresponding to the first adjusted parameter; comparing the quality rating of the translation, corresponding to first adjusted parameter to a quality rating of a translation, corresponding to the first parameter; and replacing the first parameter with the first adjusted parameter if the quality rating of the translation, corresponding to first adjusted parameter is better than the quality rating of the translation, corresponding to first parameter.

Another embodiment relates to a system comprising a processing device. The processing device is configured to create an initial population comprising a vector of parameters for elements of syntactic and semantic descriptions of a source sentence. The processing device is further configured to use a natural language compiler (NLC) system to translate the source sentence into a resulting translation based on the syntactic and semantic descriptions of the source sentence. The processing device is further configured to generate a vector of quality ratings, wherein each quality rating in the vector of quality ratings is of a corresponding parameter in the vector of parameters. The processing device is further configured to replace a number of parameters in the vector of parameters with adjusted parameters, wherein to replace the number of parameters the processing circuit is configured to: randomly select a first parameter from the vector of parameters and adjusting the first parameter to create a first adjusted parameter; compute a quality rating of the translation, corresponding to a first adjusted parameter; compare the quality rating of the translation, corresponding to the first adjusted parameter to a quality rating of a translation, corresponding to first parameter; and replace the first parameter with the first adjusted parameter if the quality rating of the translation, corresponding to the first adjusted parameter is better than the quality rating of the translation, corresponding to the first parameter.

Another embodiment relates to a non-transitory computer-readable medium having instructions stored thereon, the instructions comprise instructions to create an initial population comprising a vector of parameters for elements of syntactic and semantic descriptions of a source sentence. The instructions further comprise instructions to use a natural language compiler (NLC) system to translate the source sentence into a resulting translation based on the syntactic and semantic descriptions of the source sentence. The instructions further comprise instructions to generate a vector of quality ratings, wherein each quality rating in the vector of quality ratings is of a corresponding parameter in the vector of parameters. The instructions further comprise instructions to replace a number of parameters in the vector of parameters with adjusted parameters, wherein the instructions to replace the number of parameters comprise: instructions to randomly select a first parameter from the vector of parameters and adjusting the first parameter to create a first adjusted parameter; instructions to compute a quality rating of a translation, corresponding to the first adjusted parameter; instructions to compare the quality rating of the translation, corresponding to the first adjusted parameter to a quality rating of a translation, corresponding to the first parameter; and instructions to replace the first parameter with the first adjusted parameter if the quality rating of the translation, corresponding to the first adjusted parameter is better than the quality rating of the translation, corresponding to the first parameter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several implementations in accordance with the disclosure and are, therefore, not to be considered limiting of its scope, the disclosure will be described with additional specificity and detail through use of the accompanying drawings.

Figure 1:
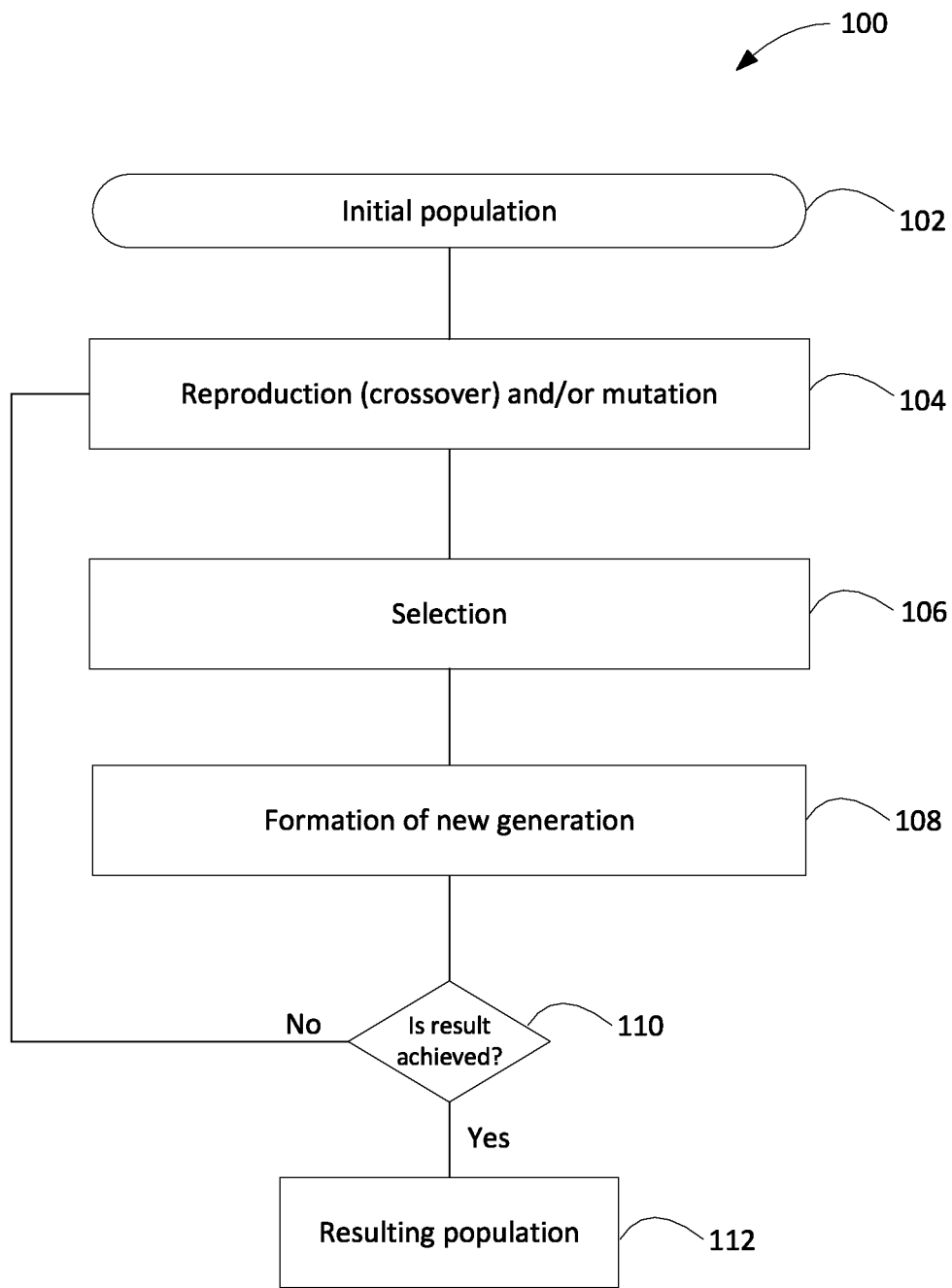
FIG. 1 shows a flow chart of a genetic algorithm in accordance with one embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Manually tagging a corpus is generally a very labor-intensive and expensive process that requires much human effort. As a result, manually tagged corpora and their sizes are very limited and are frequently deficient of the statistics needed to make them very useful. In addition, ratings corresponding to the required statistics may depend on each other, and increasing the quality of a translation by sequentially choosing values for these ratings is difficult due to the enormous number of parsings that may be present. The disclosed methods, systems, and computer readable mediums make it possible to automatically compute ratings (adjusted parameters) for various elements of a syntactic/semantic description through the implementation of a genetic algorithm.

Genetic Algorithm Description

A genetic algorithm, in general, is a heuristic search algorithm that is used to solve optimization problems and to model using random selection, combination, and variation of parameters. The use of such mechanisms is analogous to natural selection in nature. A task may be formulated so that the solution to the task can be represented as a vector of elements in which each element may be a bit, a number, or some other object. Using a method, typically a random one, a set of elements for an initial population is created. The set of elements is rated using a "fitness function," which results in each element being associated with a specific value (a "fitness" value) that determines how well that element solves the posed problem.

Based on the set of solutions obtained (a "generation"), the "fitness" values corresponding to the solutions are used to select solutions (generally the best specimens have a higher probability of being chosen), and "genetic operators" are applied to the selected solutions (in most cases, they are "crossover" or "mutation" operators). This results in the production of new solutions. A fitness value is also computed for each of the new solutions, and then the best solutions for the next generation are chosen ("selected"). This set of actions is repeated iteratively, modeling the "evolutionary process" and continuing through several life cycles ("generations") until a criterion for stopping has been met. For example, a stopping criterion may include: finding a global or local optimal solution; exhaustion of the number of generations provided for evolution; and exhaustion of the time limit provided for evolution.

Thus, the basic stages of the genetic algorithm include: providing a target function (a fitness) for specimens in the population; creating an initial population; and starting the iterative cycles. The iterative cycles may include: reproduction (crossover) and/or mutation; computing the value for the target function for all specimens; forming a new generation (selection); and then, when one or more stopping conditions are met, ending the cycle (otherwise, if the stopping conditions are not met, the cycle may iterate).

Referring to FIG. 1, a flow chart of stages of a genetic algorithm 100 is shown in accordance with one embodiment. At stage 102, an initial population is created by a random process. Even if the initial population does not turn out to be very viable, it is likely that the genetic algorithm will transform the population (through selection) to become sufficiently viable as the algorithm iterates. Thus, at stage 102, it is sufficient if the population elements can be used to compute the Fitness function. The result of stage 102 is that a population H is created that consists of N specimens.

Reproduction or crossover (stage 104) is typically analogous to sexual reproduction (i.e., to create offspring, multiple parents are needed, usually two). However, in some embodiments, reproduction is implemented differently, which may depend on the representation of the data being used. In general, the main requirement for reproduction is that the offspring are capable of inheriting traits from each of the parents (e.g., "mixing" the traits, etc.).

Specimens that are selected for reproduction are usually chosen from the entire population H rather than the specimens $H_0$ that survived a first iteration. This is because genetic algorithms often suffer from a lack of diversity in specimens of the population. For example, a single specimen of the population that is a local maximum can be extracted rather quickly, and then all the other specimen of the population lose out to it during selection. Thus, the entire population is then "driven" by copies of the specimen that is the local maximum, which is undesirable. There are various ways to counteract this effect. For example, selecting all specimens for reproduction rather than those that are the fittest results in a more diverse population.

Depending on the problem posed, the reproduction stage 104 can be accompanied or replaced by a mutation stage. A certain proportion m of mutants can be a parameter for the genetic algorithm 100. During a mutation stage, mN specimens are selected and then changed in accordance with previously determined mutation operations.

At the selection stage 106, a predetermined number of specimens are selected from the population that are to remain "alive" at the current stage of evolution. There are various ways to perform the selection, and the probability that a specimen h survives depends on the value of the fitness function, Fitness(h). The actual proportion of survivors, is typically a parameter of the genetic algorithm and may be provided in advance. Based on the results of selection, a new generation, H' is formed (stage 108). The new generation H' consists of sN elements, and the other non-selected specimens "die." If the desired result is achieved (e.g., a stopping condition is met at stage 110) then the resulting population 112 may be considered a solution to the problem posed. If the desired result is not satisfactory (stage 110), then the genetic algorithm 100 may iterate with another reproduction (crossover) and/or mutation stage 104 in order to produce a new generation.

As discussed above, one embodiment includes a method for automatically computing ratings (adjustment parameters) for various elements in a syntactic/semantic description. The ratings are computed at a system training stage. Untagged parallel corpora (a source and target language) are used for training. The corpora generally consist of at least 100,000 fragments each, although other size corpora may be used. Being parallel corpora, each fragment of the source language corpus corresponds to a fragment in the target language corpus, which is considered as a reference translation. During system training, the source language corpus undergoes translation using an NLC system as described above. Fragments obtained as translations are compared with the reference fragments and the comparison is used to draw a conclusion about the quality of the translation provided by the system.

In general, a genetic algorithm (e.g., genetic algorithm 100) may be used to solve optimization tasks. Thus, in one embodiment, genetic algorithm 100 is used for the task of maximizing translation quality. Accordingly, the target function is a rating of the translation quality. The genetic algorithm selects the set of link ratings that is used by the NLC system at a syntactic analysis stage to maximize the quality of the translation using certain criterion. The quality level may be determined in advance before the algorithm is launched. The ratings can be selected until the quality of the translation obtained reaches a specified level.

The quality criterion for a translation is formed based on a combination of two parameters: a BLEU (Bilingual Evaluation Understudy) score and a number of emergency (fault-condition) sentences. The BLEU score is a metric used to rate the quality of machine translation, and will be described in further detail below. The BLEU score has a value of 0 to 1, and indicates how close a machine translation is to a reference (e.g., the human translation). A fault-condition sentence is a sentence that is created in an emergency mode, which is automatically engaged if the NLC system cannot create a proper syntactic-semantic description of a sentence.

The task of maximizing quality can be formally written down as follows: $f(\vec{x}) \to \max$ where: $\vec{x}$ is the vector for ratings, or adjusted parameters; $f(\vec{x})$ is a quality rating function, such that $f(\vec{x}) = q$; and q is a rating for translation quality, where q=q(bleu, Ecount), which includes two numerical characteristics: bleu (the BLEU score) and Ecount (the number of emergency sentences). The function $f(\vec{x})$ represents the NLC translation system that is launched with the adjusted parameters $\vec{x}$ on the corpus. The translation results are evaluated using the BLEU score and the number of emergency sentences.

Referring again to FIG. 1, in an embodiment, at stage 102 of the genetic algorithm 100, an initial population is created, which according to the disclosure herein is a vector of sets of adjusted parameters $(\vec{x}_1, \vec{x}_2, \ldots, \vec{x}_N)$. The NLC translation system described above can then be launched for each element of the population (e.g., for each set of adjusted parameters). After a translation is completed by the NLC system, the resulting translation is compared to a reference translation, and the quality rating of the translation may be computed based on the BLEU score and the number of emergency sentences. This produces a vector of translation quality ratings $(q_1, q_2, \ldots, q_N)$ for each element in the population.

At stage 104 of the algorithm 100, "mutations" are produced. This may be implemented by choosing some elements of the population (sets of adjusted parameters) randomly, and in each of the chosen sets changing at least one parameter. The quality ratings vector $(q'_1, q'_2, \ldots, q'_N)$ may then be computed for the set of "mutated" elements $(\vec{x}'_1, \vec{x}'_2, \ldots, \vec{x}'_N)$.

At the selection stage 106, the two quality ratings (i.e. the translation quality ratings and mutation quality ratings) are compared element by element to determine which is better. If $q'_1$ is rated higher than $q_1$, then $\vec{x}_1$, in vector $(\vec{x}_2, \ldots, \vec{x}_N)$ is replaced by $\vec{x}'_1$. Otherwise, the element of the population is not replaced by the "mutated" one. By doing the replacements as described above, a new generation is formed (108), and the algorithm 100 may iterate over the corpus, starting from stage 104.

As described, the genetic algorithm is an iterative one. Thus, in one embodiment, all three basic steps (e.g., stages 104, 106, and 108) are repeated in sequence for each iteration. The algorithm may stop if a stopping condition is met. In one embodiment, the following stopping conditions may be used: 1) at least one of the elements of the quality ratings vector has attained the necessary quality level; and/or 2) the population has degenerated [i.e., after an iteration of stage 108 of the algorithm has completed, the generation formed consists of identical elements $(\vec{x}_k, \vec{x}_k, \ldots, \vec{x}_k)$].

Accordingly, when the required level of precision of the translation is achieved for one of the elements of the population and the algorithm has not been stopped (i.e. a desired result is achieved as indicated by the decision at stage 110), the resulting population 112 (i.e., a set of adjusted parameters or ratings) obtained ensures that the best structure is assigned from a language syntax and semantics perspective.

BLEU Score Additional Discussion

As mentioned above, a BLEU score is a well-known tool used to compare the quality of machine translation to human translation. This rating shows the level of quality of a machine translation from one natural language to another. The quality level is determined based on the results of comparing translations done by machine to those done by humans (e.g., the closer they are to each other, the better the quality of the machine translation). The BLEU score rating may be computed using a metric that characterizes the accuracy of the translation based on n-grams (i.e., a sequence of n words) in the sentence. This measurement can be determined as follows: All of the n-grams are extracted from the machine translation of the sentence. The extracted n-grams are then searched for in several variations of the human translation. The maximum number of repetitions of the n-gram in one of the variations of the translation is designated as $m_{max}$. If the number of repetitions of the n-gram in the machine translation, $m_w$, is greater than $m_{max}$, then $m_w$ is reduced and set to equal $m_{max}$, (otherwise $m_w$ is left unchanged). The remaining n-grams are handled in a similar manner. After processing the n-grams as discussed above, the number of repetitions $m_w$ for all of the n-grams are summed, and the resulting sum is divided by the total number of n-grams in the machine translation. This variation of computing a BLEU score rating considers the adequacy of the translation and the frequency of use of various word combinations (fluency).

A similar approach is used to compute the score of the test corpus, as the significant unit of the corpus is the sentence. Generally, there are several versions of a translation of a source sentence because many lexical variations are possible, which can lead to a distortion of the meaning and terminology in various parts of the same text. Therefore, n-grams that are consistent from one sentence to the next are produced. The $m_w$ values are computed and added (after the clipping procedure described above) for all n-grams in the corpus, and this sum is divided by the total number of n-grams in the test corpus. A translation accuracy rating $p_n$ may then be computed:

$$p_n = \frac{\sum_{C \in \{Candidates\}} \sum_{n-gram \in C} Count_{clip}(n-\text{gram})}{\sum_{C' \in \{Candidates\}} \sum_{n-gram' \in C'} Count(n-\text{gram}')}$$

Given that the accuracy of a translation drops exponentially as the length of an n-gram increases, the BLEU score needs to be computed as BLEU=$\exp(\Sigma_{n=1}^{N} w_n \log p_n)$, where the $w_n$ are constant weights ($\Sigma_n w_n = 1$). Accordingly, a metric called a "brevity penalty" can be introduced for determining the length of a machine translation. This metric is computed as follows:

$$BP \begin{cases} 1 & \text{if } c > r \\ e^{(1-\frac{r}{c})} & \text{if } c \leq r \end{cases}$$

where c is the length of the machine translation and r is the effective reference length of the corpus. The resulting BLEU score then has the form:

BLEU=$BP \cdot \exp(\Sigma_{n=1}^{N} w_n \log p_n)$.

Or for ease of computation:

$$\log BLEU = \min\left(1 - \frac{r}{c}, 0\right) + \sum_{n=1}^{N} w_n \log p_n.$$

The BLEU score ranges from 0 to 1, and a machine translation receives a score of 1 if it is identical to the human translation. In some embodiments, this score also considers the length of the sentence, the selection of words, and the order of the words. The benefit of computing a BLEU score in this manner is that the score strongly correlates with the quality rating of a translation done by hand.

Emergency Sentence Additional Discussion

As referenced above, an emergency sentence is a sentence that is parsed in a special emergency mode, which may be automatically triggered if an error is found. For example, an error may occur as the NLC system analyzes a source sentence or synthesizes a translation of the source sentence to a target language. Such errors may include, but are not limited to:

1) The presence of a syntactic mistake, including: a failure of the words in the sentence to agree (e.g., "You was't happy."); an omission of a preposition (e.g., "He went_the house and shut the door."); or the use of a superfluous preposition.

2) Lack of a comma after a word where in the word's corresponding semantic hierarchy description a comma is present.

3) Lack of a description (e.g., if there are no corresponding lexemes in the dictionary) or if the word contains a rare construction.

4) Too long of a sentence (e.g., a sentence that is too lengthy in word count may initiate the emergency mode).

Other errors may also exist. When the program runs into such difficulties, it may enter the emergency mode, which selects a usable variation of a parsing of the sentence.

One of the advantages of the embodiments described herein is that they can use untagged corpora instead of manually tagged corpora. This makes it possible to avoid using trained and expensive human labor, which substantially reduce processing costs. Further, automatic computation of function-based ratings of various elements of the syntactic-semantic description improves the quality of a translation system's results, and speeds up overall processing.

Figure 2:
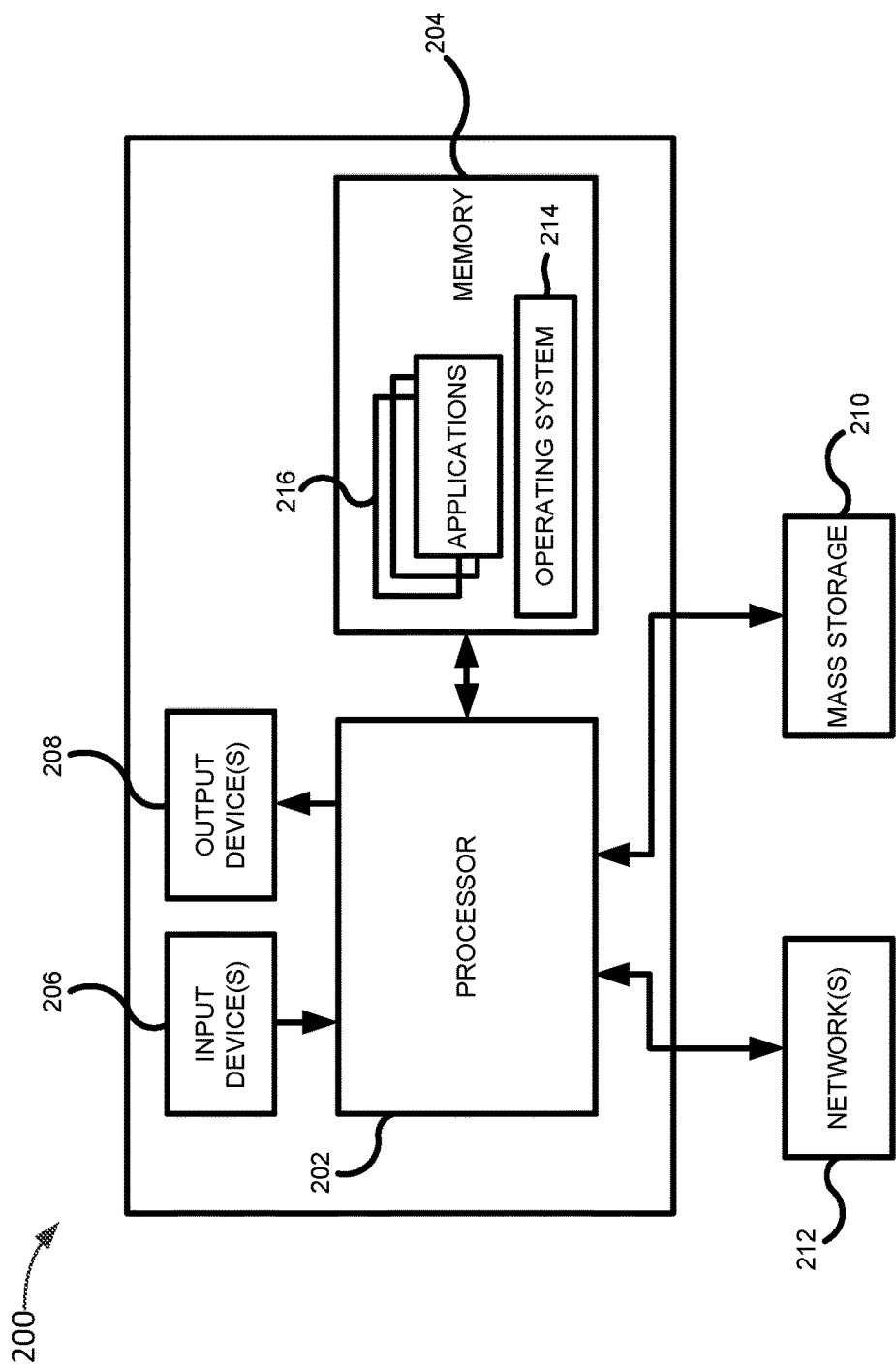
FIG. 2 shows a computer platform that may be used to implement the techniques and methods described herein, in accordance with one embodiment.

FIG. 2 shows computer platform 200 that may be used to implement the techniques and methods described herein. Referring to FIG. 2, the computer platform 200 typically includes at least one processor 202 coupled to a memory 204 and has an input device 206 and a display screen among output devices 208. The processor 202 may be any commercially available CPU. The processor 202 may represent one or more processors and may be implemented as a general-purpose processor, an application specific integrated circuit (ASIC), one or more field programmable gate arrays (FPGAs), a digital-signal-processor (DSP), a group of processing components, or other suitable electronic processing components. The memory 204 may include random access memory (RAM) devices comprising a main storage of the computer platform 200, as well as any supplemental levels of memory, e.g., cache memories, non-volatile or back-up memories (e.g., programmable or flash memories), read-only memories, etc. In addition, the memory 204 may include memory storage physically located elsewhere in the computer platform 200, e.g., any cache memory in the processor 202 as well as any storage capacity used as a virtual memory, e.g., as stored on a mass storage device 210. The memory 204 may store (alone or in conjunction with mass storage device 210) database components, object code components, script components, or any other type of information structure for supporting the various activities and information structures described herein. The memory 204 or mass storage device 210 may provide computer code or instructions to the processor 202 for executing the processes described herein.

The computer platform 200 also typically receives a number of inputs and outputs for communicating information externally. For interfacing with a user, the computer platform 200 may include one or more user input devices 206 (e.g., a keyboard, a mouse, touchpad, imaging device, scanner, etc.) and a one or more output devices 208 (e.g., a Liquid Crystal Display (LCD) panel, a sound playback device (speaker). For additional storage, the computer platform 200 may also include one or more mass storage devices 210, e.g., floppy or other removable disk drive, a hard disk drive, a Direct Access Storage Device (DASD), an optical drive (e.g., a Compact Disk (CD) drive, a Digital Versatile Disk (DVD) drive, etc.) and/or a tape drive, among others. Furthermore, the computer platform 200 may include an interface with one or more networks 212 (e.g., a local area network (LAN), a wide area network (WAN), a wireless network, and/or the Internet among others) to permit the communication of information with other computers coupled to the networks. It should be appreciated that the computer platform 200 typically includes suitable analog and/or digital interfaces between the processor 202 and each of the components 204, 206, 208, and 212, as is well known in the art.

The computer platform 200 may operate under the control of an operating system 214, and may execute various computer software applications 216, comprising components, programs, objects, modules, etc. to implement the processes described above. For example, the computer software applications may include an NLC system application, genetic algorithm application, and a BLEU score rating application. Any of the applications discussed above may be part of a single application, or may be separate applications or plugins, etc. Applications 216 may also be executed on one or more processors in another computer coupled to the computer platform 200 via a network 212, e.g., in a distributed computing environment, whereby the processing required to implement the functions of a computer program may be allocated to multiple computers over a network.

In general, the routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. The various embodiments are also capable of being distributed as Internet or network downloadable program products.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

What is claimed is:

1. A method comprising:
   generating, by a processing device, a set of vectors of parameters of a translation system utilizing syntactic and semantic descriptions;
   translating, by the translation system using the vectors of parameters, a natural language text to produce a first plurality of translated texts;
   determining a first vector of translation quality ratings reflecting translation quality of the first plurality of translated texts;
   modifying at least one parameter of each vector of parameters to produce a plurality of vectors of modified parameters;
   translating, by the translation system using the vectors of modified parameters, the natural language text to produce a second plurality of translated texts;
   determining a second vector of translation quality ratings reflecting translation quality of the second plurality of translated texts; and
   responsive to determining that an element of the second vector of translation quality ratings exceeds a corresponding element of the first vector of translation quality ratings, modifying a vector of parameters based on a corresponding vector of modified parameters.

2. The method of claim 1, wherein modifying the vector of parameters comprises:

identifying an ordinal number of the element of the second vector of translation quality ratings that exceeds the corresponding element of the first vector of translation quality ratings;
identifying the vector of parameters as having the ordinal number in the set of vectors of parameters;
identifying an element of the vector of parameters; and
replacing the element of the vector of parameters with a corresponding element of the vector of modified parameters.

3. The method of claim 1, wherein determining a first vector of translation quality ratings comprises determining a plurality of Bilingual Evaluation Understudy (BLEU) scores reflecting translation quality of the first plurality of translated texts.

4. The method of claim 1, further comprising:
repeating the translating operation using the vector of parameters responsive to evaluating a terminating condition.

5. The method of claim 4, wherein evaluating the terminating condition comprises determining that at least one element of the second vector of translation quality ratings exceeds a pre-defined quality rating value.

6. The method of claim 4, wherein evaluating the terminating condition comprises determining that the vectors of modified parameters are equal to each other.

7. The method of claim 1, wherein the translation system comprises a natural language compiler (NLC).

8. A system comprising:
a memory; and
a processing device coupled to the memory, the processing device configured to:
generate a set of vectors of parameters of a translation system that uses syntactic and semantic descriptions;
translate, by the translation system using the vectors of parameters, a natural language text to produce a first plurality of translated texts;
determine a first vector of translation quality ratings reflecting translation quality of the first plurality of translated texts;
modify at least one parameter of each vector of parameters to produce a plurality of vectors of modified parameters;
translate, by the translation system using the vectors of modified parameters, the natural language text to produce a second plurality of translated texts;
determine a second vector of translation quality ratings reflecting translation quality of the second plurality of translated texts; and
responsive to determining that an element of the second vector of translation quality ratings exceeds a corresponding element of the first vector of translation quality ratings, modify a vector of parameters based on a corresponding vector of modified parameters.

9. The system of claim 8, wherein modifying the vector of parameters comprises:
identifying an ordinal number of the element of the second vector of translation quality ratings that exceeds the corresponding element of the first vector of translation quality ratings;
identifying the vector of parameters as having the ordinal number in the set of vectors of parameters;
identifying an element of the vector of parameters; and
replacing the element of the vector of parameters with a corresponding element of the vector of modified parameters.

10. The system of claim 8, wherein determining a first vector of translation quality ratings comprises determining a plurality of Bilingual Evaluation Understudy (BLEU) scores reflecting translation quality of the first plurality of translated texts.

11. The system of claim 8, wherein the processing device is further configured to:
repeat the translating operation using the vector of parameters responsive to evaluating a terminating condition.

12. The system of claim 11, wherein evaluating the terminating condition comprises determining that at least one element of the second vector of translation quality ratings exceeds a pre-defined quality rating value.

13. The system of claim 11, wherein evaluating the terminating condition comprises determining that the vectors of modified parameters are equal to each other.

14. The system of claim 8, wherein the translation system comprises a natural language compiler (NLC).

15. A computer-readable non-transitory storage medium comprising executable instructions that, when executed by a computing device, cause the computing device to:
generate a set of vectors of parameters of a translation system that uses syntactic and semantic descriptions;
translate, by the translation system using the vectors of parameters, a natural language text to produce a first plurality of translated texts;
determine a first vector of translation quality ratings reflecting translation quality of the first plurality of translated texts;
modify at least one parameter of each vector of parameters to produce a plurality of vectors of modified parameters;
translate, by the translation system using the vectors of modified parameters, the natural language text to produce a second plurality of translated texts;
determine a second vector of translation quality ratings reflecting translation quality of the second plurality of translated texts; and
responsive to determining that an element of the second vector of translation quality ratings exceeds a corresponding element of the first vector of translation quality ratings, modify a vector of parameters based on a corresponding vector of modified parameters.

16. The computer-readable non-transitory storage medium of claim 15, wherein modifying the vector of parameters comprises:
identifying an ordinal number of the element of the second vector of translation quality ratings that exceeds the corresponding element of the first vector of translation quality ratings;
identifying the vector of parameters as having the ordinal number in the set of vectors of parameters;
identifying an element of the vector of parameters; and
replacing the element of the vector of parameters with a corresponding element of the vector of modified parameters.

17. The computer-readable non-transitory storage medium of claim 15, wherein determining a first vector of translation quality ratings comprises determining a plurality of Bilingual Evaluation Understudy (BLEU) scores reflecting translation quality of the first plurality of translated texts.

18. The computer-readable non-transitory storage medium of claim 15, further comprising executable instructions causing the processing device to:
repeat the translating operation using the vector of parameters responsive to evaluating a terminating condition.

19. The computer-readable non-transitory storage medium of claim 18, wherein evaluating the terminating condition comprises determining that at least one element of the second vector of translation quality ratings exceeds a pre-defined quality rating value.

20. The computer-readable non-transitory storage medium of claim 18, wherein evaluating the terminating condition comprises determining that the vectors of modified parameters are equal to each other.

* * * * *